United States Patent [19]

Nowakowski

[11] 4,135,846

[45] Jan. 23, 1979

[54] INSIDE-OUTSIDE DEBURRING TOOL AND OPTIONAL FLYCUTTER

[76] Inventor: James J. Nowakowski, 2908 Shady La., Racine, Wis. 53402

[21] Appl. No.: 808,381

[22] Filed: Jun. 20, 1977

[51] Int. Cl.² .................. B23B 51/04; B23B 43/02
[52] U.S. Cl. .................................... 408/183; 408/157
[58] Field of Search ............ 408/183, 182, 181, 157, 408/185, 196, 209, 20, 21

[56] References Cited

U.S. PATENT DOCUMENTS

| 872,385 | 12/1907 | Snow et al. | 408/182 |
| 1,436,974 | 11/1922 | Michalczyk | 408/183 |
| 3,365,988 | 1/1968 | Karlan | 408/196 |

Primary Examiner—Leonidas Vlachos
Attorney, Agent, or Firm—Clarence A. O'Brien; Harvey B. Jacobson

[57] ABSTRACT

An inside-outside deburring tool and flycutter having a body provided with an internal slot in which are slidably disposed a pair of tool bit holders. Interchangeable support elements mount the holders within the slot in such a manner that the holders are adjustable within the slot either independent of or equally and oppositely with one another.

9 Claims, 11 Drawing Figures

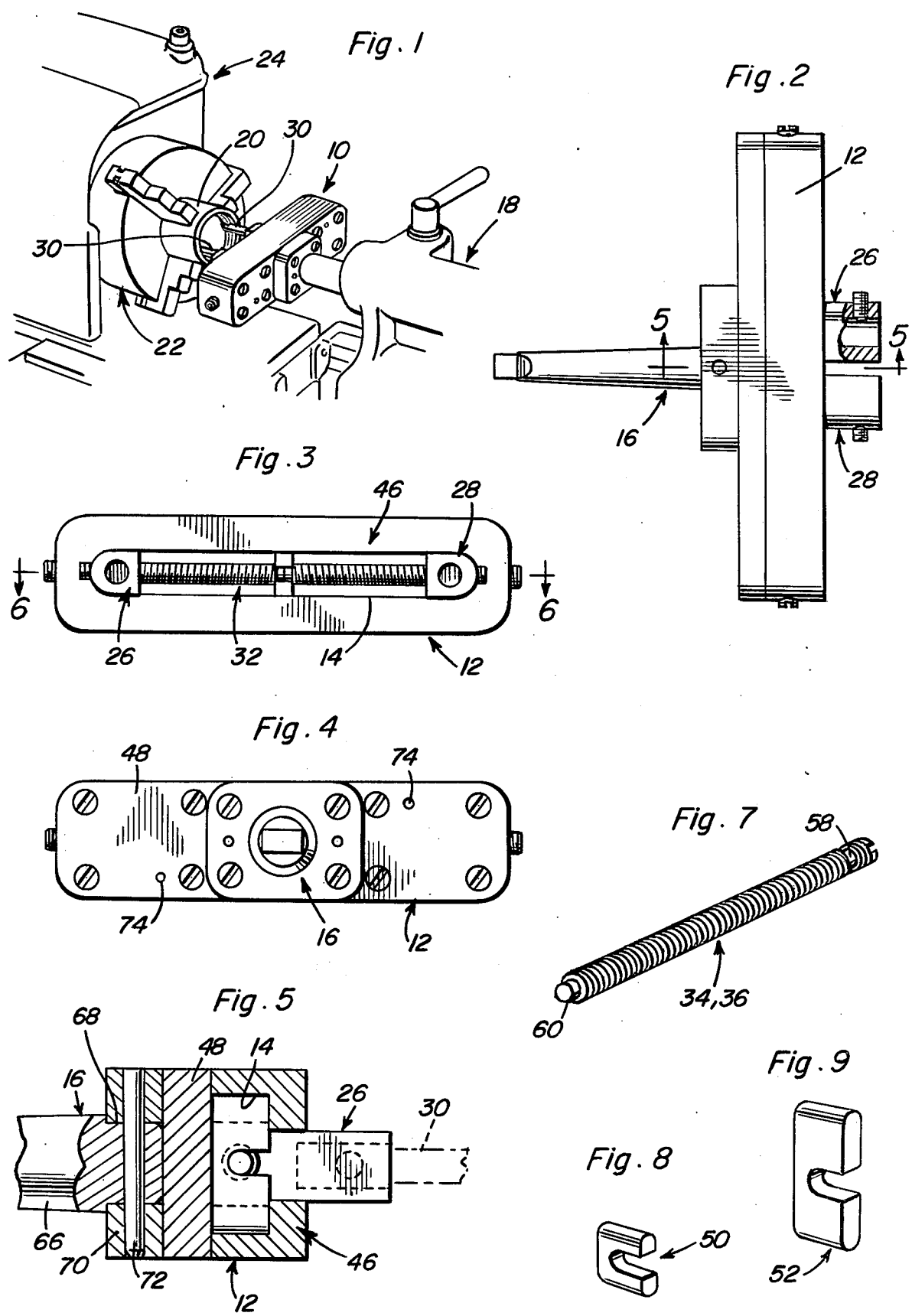

INSIDE-OUTSIDE DEBURRING TOOL AND OPTIONAL FLYCUTTER

BACKGROUND OF THE INVENTION

1. Field of the Invention

This invention relates generally to rotary cutting tools, and particularly to a tool provided with interchangeable elements permitting the tool to be employed either as a deburring tool or as a flycutter, as desired.

2. Description of the Prior Art

U.S. Pat. No. 2,677,887, issued May 11, 1954, to J. S. Saboda, discloses a circular cutter which includes a separate pair of threaded rods on which tool bit holders are mounted so as to permit a pair of concentric circles to be simultaneously cut in a piece of material. Further, U.S. Pat. No. 2,906,145, issued Sept. 29, 1959, to C. L. Morse, and U.S. Pat. No. 733,821, issued July 14, 1903, to J. G. Dixon, disclose circular cutters and U.S. Pat. No. 1,128,155, issued Feb. 9, 1915, to M. R. Lackey, discloses a bearing scraper which employs only a single rod for mounting a tool holder or holders on a tool assembly. None of these known circular cutting devices has the flexibility, however, to permit either independent or dependent movement of the tool holders to be possible, as desired, to perform a particular cutting function.

For example, when deburring a bushing, and the like, as well as when cutting concentric holes in a workpiece, it is necessary to have independent movement of the tool bit holders. When performing flycutting operations, on the other hand, it is necessary to have dependent movement of the tool bit holders. Although only a single tool bit need be used with a flycutter, as shown in U.S. Pat. No. 3,130,610, issued Apr. 28, 1964, to A. A. Bogdan, it is desirable to employ a pair of bits on the tool bit holder supporting bar of the cutter in order to achieve more rapid and uniform cutting of the workpiece.

U.S. Pat. No. 2,358,741, issued Sept. 19, 1944, to P. Shelby, discloses a countersinking attachment, particularly for use with milling machines which also employs only a single cutting bit holder for the purpose of making flat the bottom of a countersink.

SUMMARY OF THE INVENTION

It is an object of the present invention to provide a circular cutter in the form of a kit permitting the cutter to be used both as a deburring tool and a flycutter.

It is another object of the present invention to provide a circular cutter which can be converted between a deburring tool and a flycutter in a simple and easy manner.

These and other objects are achieved according to the present invention by providing an inside-outside deburring tool and flycutter having: a body provided with an internal cavity; a shank mounted on the body for attaching the body to a machine tool; at least one cutting bit tool holder movably disposed in the cavity; and a support arrangement associated with the body for adjustably mounting the tool holder on the body.

Preferably, there are a pair of tool holders, and the support arrangement includes a pair of rods each arrangeable supporting a respective one of the tool holders for individual adjustment of the holders, and a single shaft arrangeable supporting both of the tool holders for dependent adjustment of the holders, the pairs of rods being associated with the body, shank, and tool holders for forming an inside-outside deburring tool, and the shaft being associated with the body, shank, and the tool holders to form a flycutter.

The support arrangement further includes a plurality of substantially U-shaped keepers, with two of the keepers being substantially of the same size for retaining the pair of rods, and the third of the keepers being larger than the aforementioned two of the keepers for retaining both the rods and the shaft within the cavity provided in the body. Suitable recesses are provided in the body for receiving the keepers, with each of two of the recesses being disposed for receiving the two of the keepers which are of substantially the same size and in contact with the associated rods for preventing axial displacement of the rods. The third of the recesses is disposed centrally of a longitudinal extent of the cavity provided in the body for receiving the third of the keepers, with the latter also engaging the rods or the shaft in order to prevent axial displacement of the rods or the shaft while permitting rotation of same.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view showing an inside-outside deburring tool and flycutter according to the present invention mounted on a conventional lathe for deburring a bushing.

FIG. 2 is a side elevational view, partly cut away and in section, showing the inside-outside deburring tool and flycutter according to the present invention.

FIG. 3 is a bottom plan view of the device shown in FIG. 2, but with the tool holders moved to different positions, and set up for use as a deburring tool.

FIG. 4 is a top plan view of the device seen in FIGS. 2 and 3.

FIG. 5 is an enlarged, fragmentary, sectional view taken generally along the line 5—5 of FIG. 2.

FIG. 7 is a perspective view showing a rod used according to the invention to form a deburring tool.

FIG. 8 is a perspective view showing one of the keepers which supports the rod such as shown in FIG. 7 within the body of the invention.

FIG. 9 is a perspective view showing another of the keepers which supports the tool holder support member within a cavity provided in the body of the invention.

DESCRIPTION OF THE PREFERRED EMBODIMENT

Figure 6:
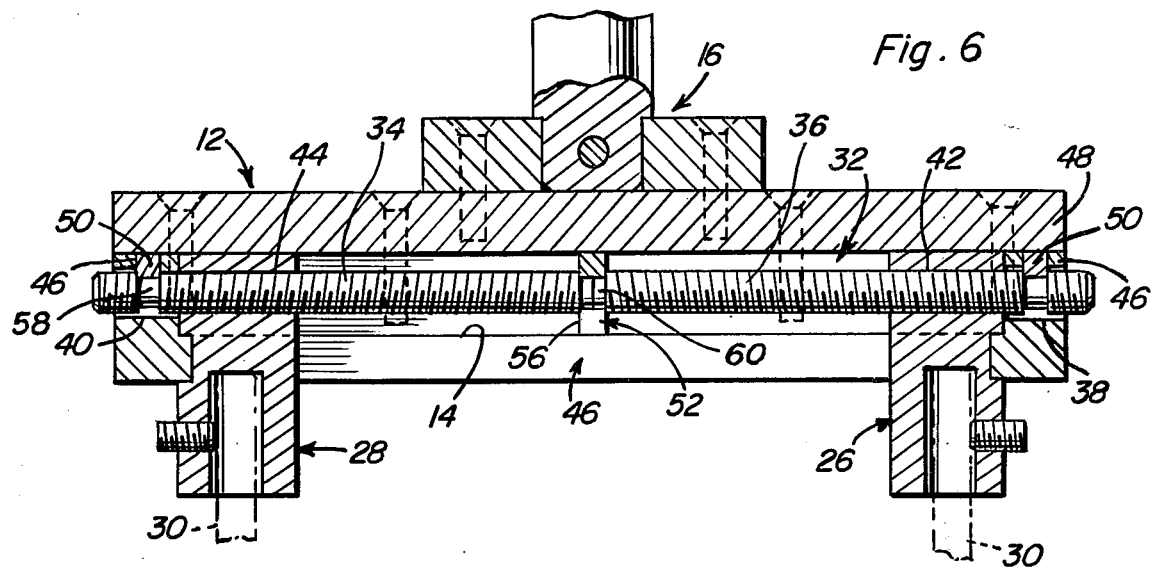
FIG. 6 is an enlarged, fragmentary, sectional view taken generally along the line 6—6 of FIG. 3.

Referring now more particularly to the FIGS. 1 through 9 of the drawings, an inside-outside deburring tool and flycutter 10 is shown as being formed by a generally longitudinally extending body 12 provided with an internal cavity in the form of a slot 14. A shank 16 is appropriately mounted on body 12 for permitting attachment of body 12 to a machine tool. As shown in FIG. 1, shank 16 is attached to a tail stock 18 so as to permit the invention to deburr a bushing 20 mounted in the chuck 22 of a conventional lathe 24 which includes tail stock 18. It will be appreciated, however, that the deburring tool and flycutter 10 according to the invention can be employed with other machine tools, such as vertical milling machines, drill presses, and the like, not shown in the drawings. A pair of cutting bit tool holders 26 and 28 are slidably disposed in slot 14 so as to support the conventional bits 30, and are themselves supported by an arrangements 32 for adjustment either independently or dependently of one another.

Support arrangement 32 includes a pair of rods 34 and 36 each supporting a respective one of the tool holders 26 and 28 for individual, or independent, adjustment of holders 26, 28. Rods 34, 36 are associated with body 12, shank 16 and holders 26, 28 to form an inside-outside deburring tool. Body 12 is provided with a pair of coaxial bores 38 and 40 disposed in longitudinally spaced ends of body 12 so as to receive end portions of the rods 34, 36. As can be seen from the drawings, the longitudinal extent of the rods 34, 36 is provided with screw threads which engage with the internal screw threads provided in the apertures 42, 44 in order to permit adjustment of the holders 26, 28 longitudinally of slot 14 by rotation of the rods 34, 36. For the latter purpose, suitable slots are provided in the end portions of the rods 34, 36 which are to be disposed adjacent the longitudinal ends of body 12.

Body 12 is preferably constructed as illustrated wherein it is partially formed by a part 46 in the form of a receptacle defining the slot 14, and a part 48 in the form of a cover plate which fits over the top of the part 46 and provides a mounting surface for shank 16. The support arrangement 32 further includes holders in the form of keepers 50 and 52 disposed for rotatably retaining the rods 34, 36 against longitudinal movement within slot 14. More specifically, there are three keepers employed with a kit forming the present invention, with there being two keepers 50 of substantially U-shaped configuration and approximately of the same size, and one keeper 52 also of substantially a U-shaped configuration and of a larger size than keepers 50. All three of these keepers 50, 52 are employed to retain the rods 34, 36 within body 12. More specifically, a pair of recesses 54 are provided adjacent the ends of body 12 so as to communicate with the associated bores 38, 40 and receive the keepers 50, while a recess 56 is provided in body 12 substantially centrally of the longitudinal extent of slot 14 for receiving keeper 52. As can be readily seen from FIG. 6, the keepers 50 and 52 can be readily inserted into and removed from their associated recesses 54 and 56 by removal of the part 48 of body 12. Provided adjacent the end portion of the rods 34, 36 that are to be disposed adjacent the ends of body 12 are grooves 58 which receive the keepers 50 inserted into the recesses 54. In a like manner, a trunion 60 is provided on the other of the end portions of the rods 34, 36 for cooperating with one another at the longitudinal center of body 12 so as to receive the keeper 52. By this arrangement, the rods 34, 36 will be securely retained within body 12, although permitted to rotate relative to the body 12 so as to permit longitudinal adjustment of the tool holders 26 and 28.

Figure 10:
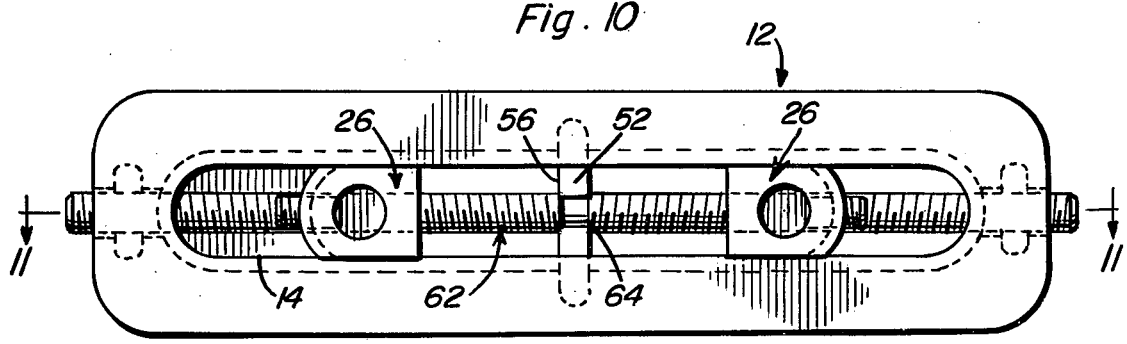
FIG. 10 is a bottom plan view showing the invention set up to function as a flycutter.
Figure 11:
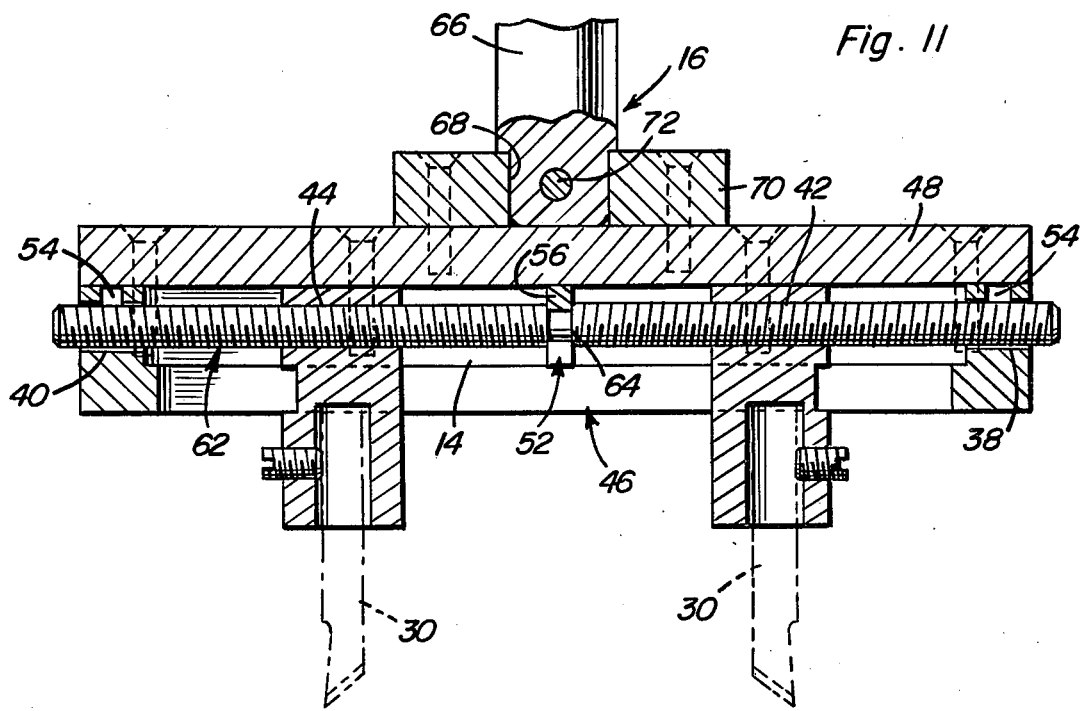
FIG. 11 is a fragmentary, sectional view taken generally along the line 11—11 of FIG. 10.

Referring now more particularly to FIGS. 9 and 10 of the drawings, support arrangement 32 also includes a longitudinally extending screw-threaded shaft 62 which is approximately the length of rods 34 and 36 arranged coaxially and abutting one another so as to extend from end to end of body 12. More specifically, shaft 62 is disposed in bores 38 and 40 and threadedly engages with the holders 26 and 28. An annular groove 64 is arranged substantially centrally of the longitudinal extent of shaft 62 for being engaged by keeper 52 disposed in recess 56 in order to prevent axial movement of shaft 62 relative to body 12. In this manner, shaft 62 is associated with body 12, shank 16 and tool holders 26, 28 to form a flycutter in which the displacement of the holders 26 and 28 will always be the same relative to the groove 64 of shaft 62 and cause the bits 30 retained in holders 26 and 28 to constantly be on the same radius from the center point of the tool as defined by groove 64.

The shank 16 is preferably constructed to include a tapered shank portion 66 having a base end of reduced size so as to fit in a hole 68 provided in mounting plate 70 secured to the cover part 48 of body 12. A pin 72 disposed in mating apertures secures the shank portion 66 to plate 70.

It will be understood that the shank of the tool according to the invention must be changed for adaption of the tool to each machine tool with which the invention is to be used.

Dowel pins 74 are advantageously provided on the cover part 48 for permitting rapid realignment of the part 48 with the part 46 and facilitating reassembly of body 12 of the tool. In addition, it will be appreciated that one of the rods 34, 36 will have a right hand thread and the other a left hand thread, while the threaded portions of the shaft 62 on either side of the groove 64 will also be provided with respective left hand and right hand threads. The difference in threads is to cause the holders 26 and 28 to move in opposite directions when the rods 34, 36 and shaft 62 are rotated in a given direction.

As can be appreciated from the above description and from the drawings, the deburring tool and flycutter according to the present invention provides a simple yet versatile and reliable device for performing varied functions involved with machine tool operations. As shown in FIG. 1, one of the bits 30 can be disposed so as to engage the outside of an end surface of a bushing 20, and the like, while the other bit 30 can be disposed inside so that the inside and outside surfaces of an end of a bushing 20 to be finished off can be simultaneously deburred. Suitable adjustment of the tool holders 26 and 28 permits other functions to be possible in deburring operations, while the use of the shaft 62 permits efficient flycutting operations to be accurately performed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An inside-outside deburring tool and flycutter, comprising, in combination:
    (a) a body provided with an internal cavity;
    (b) a shank mounted on the body for attaching the body to a machine tool;
    (c) a pair of cutting tool holders movably disposed in the cavity provided in the body; and
    (d) support means associated with the body for adjustably mounting the tool holder on the body, the support means including a pair of rods each supporting a respective one of the tool holders for individual adjustment within the cavity provided in the body, and a single shaft supporting both of the tool holders for displacement dependent on one another, the pairs of rods being arrangeable with the body, shank and tool holders in a first arrangement of the elements to form an inside-outside deburring tool, and the shaft being arrangeable with the body, shank, and tool holders in a second arrangement of the elements to form a flycutter.

2. A structure as defined in claim 1, wherein the body has two bores disposed communicating with the cavity, with the pair of rods each being provided with external screw threads and disposed in a respective one of the bores extending into the cavity toward one another, and the tool holders each being provided with a screw threaded aperture threadingly receiving a respective one of the pair of rods.

3. A structure as defined in claim 2, wherein the body is a longitudinally extending member, and the cavity is a slot provided in the body and extending longitudinally thereof.

4. A structure as defined in claim 2, wherein the support means further includes holder means for rotatably retaining the rods against longitudinal movement in the cavity provided in the body.

5. A structure as defined in claim 4, wherein the body is a longitudinally extending member, and the cavity is a slot provided in the body and extending longitudinally thereof.

6. A structure as defined in claim 4, wherein the holder means includes three substantially U-shaped keepers, two of the keepers being substantially the same size and arrangeable retaining the rods within the cavity provided in the body, and the third of the keepers being larger than the two of the keepers and arrangeable retaining both the rods and the shaft within the cavity provided in the body, with recesses being provided in the body for receiving the keepers, each of two of the recesses being disposed in communication with a respective one of the bores for receiving a respective one of the pairs of keepers, and a further one of the recesses being disposed centrally of a longitudinal extent of the cavity for receiving the third of the keepers.

7. A structure as defined in claim 5, wherein the rods each have two longitudinally spaced ends and are provided with an annular groove adjacent one of the ends for registering with an associated one of the two of the recesses and receiving one of the pair of keepers, and the shaft is provided with an annular groove substantially centrally of the longitudinal extent of the shaft for registering with the further one of the recesses and receiving the third of the keepers, with the rods each having the other of the ends provided with annular trunions cooperating to form an annular groove registered with the further of the recesses for receiving the third of the keepers.

8. A structure as defined in claim 7, wherein the body is a longitudinally extending member, and the cavity is a slot provided in the body and extending longitudinally thereof.

9. A structure as defined in claim 1, wherein the body is a longitudinally extending member, and the cavity is a slot provided in the body and extending longitudinally thereof.

* * * * *